United States Patent [19]
Sullivan et al.

[11] 3,749,878
[45] July 31, 1973

[54] GAS ASSISTED LASER CUTTING APPARATUS

[75] Inventors: Arthur Basil Joseph Sullivan, Letchworth; Peter Thomas Houldcroft, Royston, both of England GB

[73] Assignee: National Research Development Corporation, London, England

[22] Filed: Jan. 19, 1971

[21] Appl. No.: 107,675

Related U.S. Application Data
[62] Division of Ser. No. 712,782, March 13, 1968, Pat. No. 3,597,578.

[30] Foreign Application Priority Data
Mar. 16, 1967 Great Britain ............... 12,447/67
July 31, 1967 Great Britain ............... 35,021/67
Dec. 5, 1967 Great Britain ............... 55,346/67

[52] U.S. Cl. ......... 219/121 L, 250/49.5, 331/94.5 A
[51] Int. Cl. ............................................. B23k 27/00
[58] Field of Search ............ 219/69, 121 EB, 121 L, 219/130, 137, 70, 74, 343; 331/94.5; 250/49.5

[56] References Cited
UNITED STATES PATENTS

| | | | |
|---|---|---|---|
| 3,453,097 | 7/1969 | Hafner | 219/121 LM |
| 3,169,183 | 2/1965 | Radtke et al. | 214/121 EB |
| 3,156,810 | 11/1964 | Samuelson | 214/121 EB |
| 3,383,491 | 5/1968 | Muncheryan | 219/121 L |
| 3,242,314 | 3/1966 | Eckles | 219/343 |
| 3,388,314 | 6/1968 | Gould | 219/121 L |
| 3,364,087 | 1/1968 | Solomon et al. | 219/121 EM |
| 3,369,101 | 2/1968 | Di Curcio | 219/121 L |
| 3,204,081 | 4/1965 | Iceland | 219/125 PL |
| 3,417,222 | 12/1968 | Cannon et al. | 219/121 EB |
| 3,360,398 | 12/1967 | Garibotti | 219/121 LM |
| 3,226,527 | 12/1965 | Harding | 219/121 L |

OTHER PUBLICATIONS
"Research on Lasers and Plasma Jets" BF Scott, International Journal of Machine Tool Research, Vol. 5, pp. 11–24 (1965).

*Primary Examiner*—J. V. Truhe
*Assistant Examiner*—George A. Montanye
*Attorney*—Kemon, Palmer & Estabrook

[57] ABSTRACT

Apparatus for subjecting a workpiece to the action of a laser beam comprises a nozzle and optical means for directing the laser beam at the workpiece through the nozzle, together with means for directing a gas stream at the workpiece through the same nozzle.

14 Claims, 7 Drawing Figures

GAS ASSISTED LASER CUTTING APPARATUS

This application is divided from our application Ser. No. 712,782, filed Mar. 13, 1968, now U.S. Pat. No. 3,597,578 and is concerned with the construction of a nozzle for directing a gas at a workpiece at which a laser beam is also directed.

Thermal cutting and gouging is widely used for cutting metals where a broad cut is tolerable, the accuracy of the thermal processes being insufficiently high to permit them to be used as an alternative to anything but rough machining. The reason for this inaccuracy is that the heating cannot be sufficiently concentrated, especially where a gas stream, such as oxygen, used to sweep away the molten metal is of a kind having an exothermic reaction with the preheated area of the metal. This exothermic reaction is self-sustaining when the temperature of the workpiece reaches a predetermined value and consequently the width of the cut varies with the width of the stream of oxygen which is directed at the preheated area. In addition to the inaccuracy of the cut, the existing thermal methods have the further disadvantage that heating over a considerable area of the workpiece tends to damage it, for example by distorting it or affecting its properties or structure.

As a heat source, the laser beam permits an energy concentration of an exceedingly high order and for some years the laser has been known as a piercing instrument where fine holes are required. Moreover, it can be focused to a small spot with considerable accuracy and a laser which can deliver energy to the workpiece at a rate sufficient to boil the metal in its path can achieve a cutting process. Consequently, the laser has been considered as a cutting instrument for metals, to make very narrow cuts such as would not be possible with conventional thermal cutting methods.

We have found that a particularly effective form of apparatus for directing a gas stream at the point on a workpiece at which a laser beam is concentrated includes, in addition to optical means for directing the laser beam on to the workpiece, a nozzle through which the laser beam emerges from the apparatus in the direction of the workpiece, and means for directing a gas stream through the same nozzle towards the workpiece substantially coaxially with the laser beam.

In the said application Ser. No. 712,782, we have described and claimed a method of cutting completely through a workpiece in which a laser beam is concentrated on a workpiece and the beam and workpiece are moved relatively to one another and in which a jet of a gas capable of taking part in an exothermic reaction is directed on to the moving region of the workpiece at which the laser beam is concentrated to provoke an exothermic reaction, this being continued until the workpiece is cut through, the reactive gas jet then sweeping away the products of combustion through the cut. Apparatus embodying the present invention can be used to provide a flow of exothermically reactive gas towards the workpiece from the nozzle through which the laser beam emerges. When the exothermically reacting gas is directed on to the workpiece, not only is there an increase in the rate of cutting but the accuracy and fineness of the cut are substantially unimpaired by the addition of the gas stream, in spite of the fact that the cross-sectional area of this stream at the workpiece may differ by an order of magnitude from that of the laser beam. It seems that the width of the cut is determined largely by the laser beam and not by the gas jet, which controlled the width of the cut in the earlier processes of thermal cutting and gouging which utilised an exothermic reaction. In the said copending application, we have put forward some possible reasons for this surprising behaviour. Briefly, we believe that the strip which is being cut is raised very rapidly to a temperature which is considerably higher than that associated with conventional cutting processes and that as a consequence the proportion of the heat input which is consumed as latent heat in melting and vaporising, and thus is removed from the body of the metal by the gas stream, is much more significant than in the case of the earlier processes of thermal cutting. There is, therefore, little spreading of the zone which is at a temperature high enough to take part in the exothermic reaction. The absence of spreading due to self-sustaining exothermic reaction is also evident in the direction of the cut and this provides an additional advantage in that the cutting process can be stopped very rapidly by switching the laser off. Consequently, the method lends itself particularly well to machine-controlled thermal cutting, in which a machine responsive to instructions programmed on a record medium may be arranged to switch on and off the laser beam and to start, stop and change the direction of relative movement between the nozzle and the workpiece.

For a cutting or gouging operation, the apparatus embodying the invention is provided with driving means for effecting relative movement between the nozzle and the workpiece in the required direction of the operation. In addition, the apparatus advantageously includes a guide system for the laser beam to permit modification of the path of the beam between the laser and the nozzle.

Although we can cut stainless steel and also Nimonic and other refractory metals without a fluxing agent using an exothermically reacting gas, there are some materials for which a fluxing agent is useful. For example, ceramic material, brick, tile, concrete, stone, rock and glass do not react exothermically with oxygen and to cut these materials with a laser beam we introduce a metal or a compound which permits an exothermic reaction with the gas and creates a fluxing action with the material to be cut at the point where the laser beam strikes this material. The gas jet then sweeps the fused material or the low melting point mixtures away from the heated area. As an example, the fluxing agent may be fed in powdered form in a gas jet to the heated area and may be iron or may be formed of halides of the alkali metals. In another form the fluxing agent is coated on to the surface of the material to be cut, for example by painting or spraying.

With most of the materials mentioned above, iron may be used as a fluxing agent in conjunction with an oxygen jet. For example, iron powder may be fed into the laser system in an oxygen jet. The iron powder oxidises rapidly and provides super-heated iron oxide which fluxes and cuts the ceramic or other material. Alternatively, the iron may be fed in as wire or strip at the point where the gas jet and the laser beam meet. A further possibility is to feed a volatile or vaporised halide (for example a halide of iron) into an oxygen jet directed at the portion of the workpiece heated by the laser beam. The combination of iron as a fluxing agent with an oxygen jet can also be used for aluminium, which also forms refractory oxides when heated.

The nozzle through which the beam and gas jet emerge, although extremely compact, is not subjected to substantial heating and thus the intense potential heating of the laser beam is safely combined with an active gas such as oxygen, for example. This is contrary to experience in the "coarse" forms of thermal cutting employing a reactive gas, in which substantial heating of the nozzle takes place. In fact, the plasma torch which, until the use of the laser for thermal cutting, achieved the highest form of convergence and concentration of heat, it was not possible to use a gas producing an exothermic reaction because the hot parts of the torch would be rapidly oxidised and eroded, and as a consequence only an inert gas could be used, the molten metal being swept away by the inert gas.

For gouging, an oblique arrangement of the nozzle relative to the workpiece is necessary and more than one laser can be used. For the purposes of this specification, the term "gouging" is intended to include machining operations such as parting a bar in a lathe, turning and planing.

In order that the invention may be better understood some examples of apparatus for carrying the invention into effect will now be described with reference to the accompanying drawings, in which.

Figure 1:
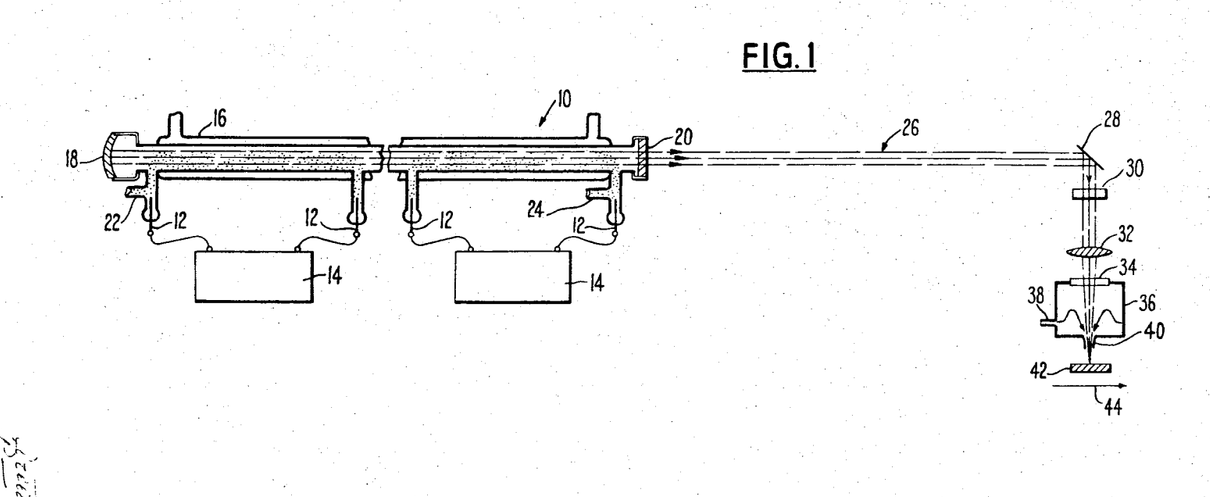
FIG. 1 shows diagrammatically the arrangement of a first form of apparatus.

In FIG. 1, the laser 10 is of the carbon dioxide-nitrogen-helium type and has a length of 10 metres and a bore of 30mm. There are five sections to the tube, only two being shown in the diagram, and each section has its own electrodes 12 and its own electrical supply 14. The power supply provides 20 k.V. for striking a 9 k.V. at 45m.A. when the laser is running. The laser body 16 has a fully reflecting concave mirror 18 of gold-surfaced stainless steel at one end and a plane semi-reflecting germanium disc 20 at the other end. The concave mirror has a focal length slightly in excess of 10 metres. The gas in which the discharge is to be created flows into the laser body through the inlet 24 and out from the laser body through the outlet 22.

It should be understood that the design and operation of the laser form no part of the present invention and it will be sufficient to state that when the laser is in operation a substantially parallel beam of coherent light emerges from the laser through the disc 20. In the present case, the laser was operated from an AC supply of 50 Hz and consequently the output was pulsed at 100 pulses per second.

The emergent beam 26 is reflected by an aluminised mirror 28 through a safety shutter 30 to a focusing lens 32. From this lens, the beam passes through a window 34 into an oxygen chamber 36. Oxygen enters this chamber through an inlet 38 and emerges in the direction of the workpiece through a nozzle 40. The axis of the laser beam passes centrally through the nozzle 40 and the beam is brought to a focus by the lens 32 at or close to the surface of the workpiece 42. The lens 32 can be dispensed with if the mirror 28 is replaced by a parabolic mirror suitably positioned off the optical axis. A focal position 1/16 inch beyond the nozzle has been found satisfactory when using an oxygen jet of diameter 0.10 inch; this arrangement gives a clean and stable cut.

As indicated by the arrow 44, the workpiece is moved horizontally to permit the laser, assisted by the oxygen stream, to make a cut. As the cut proceeds, the molten or vaporised material is ejected through the cut zone by the oxygen jet which also serves to provide an exothermic reaction, as described above.

We have achieved cuts of from 0.015 inch to 0.025 inch width in mild steel, high carbon tool steel and stainless steel of 0.10 inch thickness at speeds up to 40 inch per minute, provided that a minimum energy density is achieved. It appears that the addition of the oxygen jet does not greatly affect the width of the cut, although the addition of the oxygen jet permits cutting of metal several times thicker than what can be achieved with the unaided laser. The width of cut is governed primarily by the diameter and energy of the laser beam, but also by the speed of movement and the thermal diffusivity of the workpiece. The narrow cut gives a precision not previously obtained with oxyacetylene cutting. Increased laser power enables a higher cutting speed but with an AC-operated laser, the speed is limited by the pulsed nature of the supply. DC operation removes this difficulty.

The smoothness and stability of cutting depends upon exceeding a minimum speed which varies according to the laser power and the material which is being cut. Below this speed, (or below a threshold power) the laser loses control and the melting begins tp propagate beyond the area directly heated by the laser. This results in melting large holes and in intermittent cutting operation. As the speed increases, the laser again assumes control and gives a fast clean cut of small width. The threshold laser power is allied to the minimum speed, since if the power is insufficient the threshold speed of cutting cannot be achieved. For cutting mild steel of 0.10 inch thickness at a speed of 40 ins/min., we found that it was desirable for the laser power to exceed 300 watts. For thickness of 0.030 inch, a power of 250 watts gave a cutting speed of 55 ins/min., and a power of 190 watts gave a speed of 17½ins/min. For a thickness of 0.060 inch, the cutting speed with a power of 250 watts was reduced to 17½ins/min. It may in some cases be desirable to provide extra power for starting and this can be achieved by generating an initial laser pulse of an energy greater than its continuous rating.

Figure 2A:
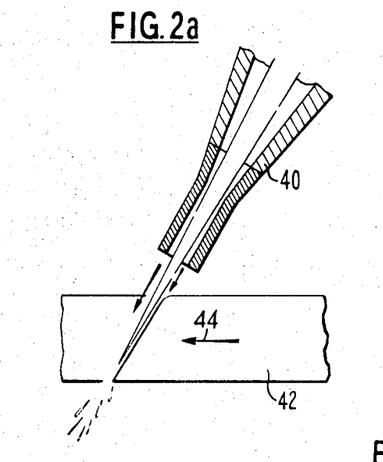
FIGS. 2a, 2b and 2c show diagrammatically the cutting and gouging of metals.
Figure 2B:
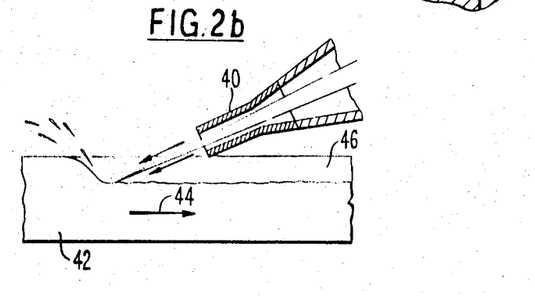

In FIG. 1, the laser beam and gas jet strike the workpiece perpendicularly to its surface. However, the nozzle through which the beam and jet emerge can be arranged at an angle to the workpiece surface, as shown in FIG. 2a. FIG. 2b shows a gouging operation in which the nozzle is arranged at an angle of about 30° to the workpiece surface. The oxygen jet blows the molten metal ahead of it and the workpiece 42 travels in the direction indicated by the arrow 44. In this way a groove 46 is formed in the workpiece.

The width of the groove may be greater at the surface of the workpiece of a cut obtained with the same nozzle and laser and we believe that this is because the molten material is not blown straight through the workpiece, as in the case of a cut, but instead gives up some of its heat energy on its way up the sides of the groove.

Figure 2C:
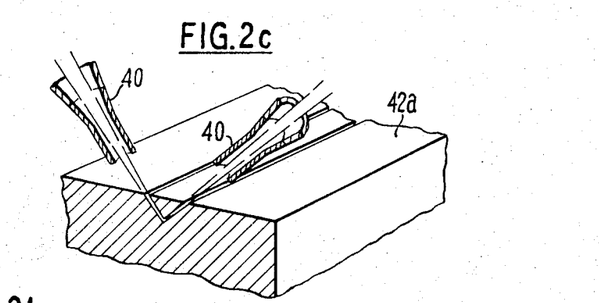

FIG. 2c shows the use of a pair of nozzles 40, each nozzle being directed at an angle to the workpiece surface 42a. The laser beams projected through the nozzles converge to a point below the surface of the workpiece and a jet of gas emerges from each nozzle coaxially with the beam. Together the beams make a substantially V-shaped cut in the workpiece and in response to relative movement between the workpiece and the pair of nozzles a workpiece portion of V-shaped cross-section is removed.

Figures 3, 5:
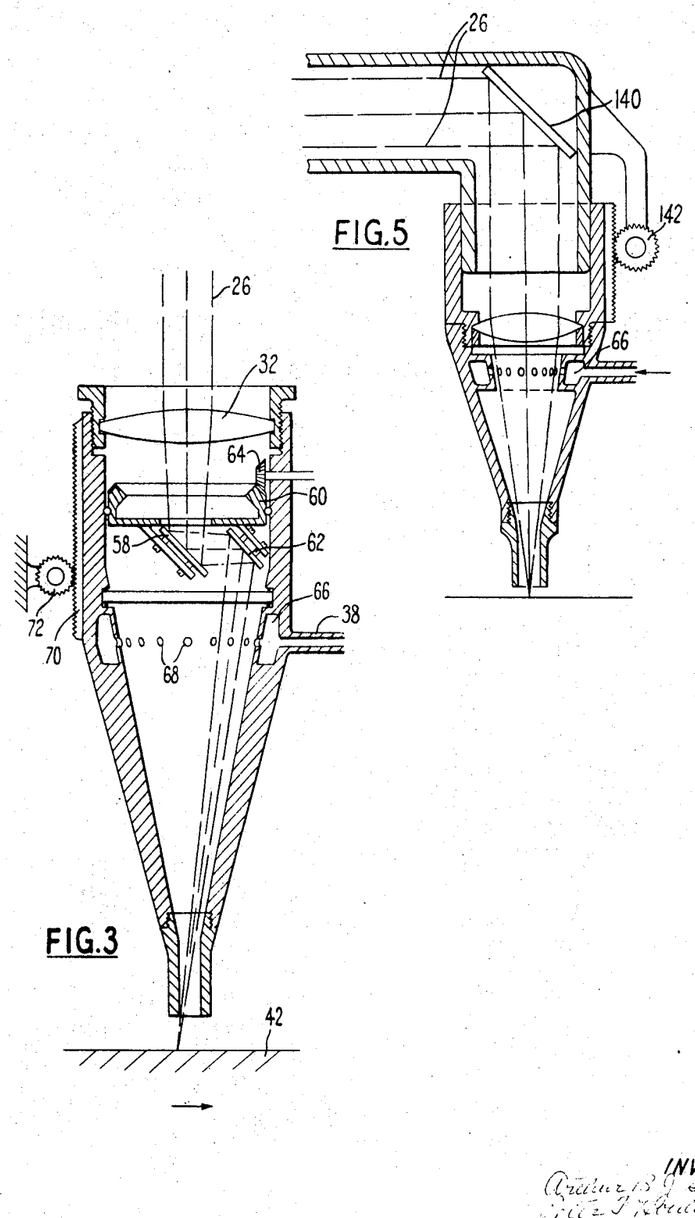
FIG. 3 shows a form of nozzle for imparting a circular movement to the laser beam at the surface of the workpiece.
FIG. 5 shows in section an adjustable nozzle.

For cutting thicker workpieces, it may be desirable to increase the width of the cut, as the width of the cut at the base might otherwise be insufficient to allow the passage of enough gas. To increase the effective beam diameter at the workpiece surface, the laser beam can be slightly defocused, that is to say brought to a focus above the work surface, provided that the laser has sufficient power. As an alternative to defocusing the laser beam, the beam can be given a cyclically repetitive movement transverse to the direction of the cut. A nozzle of the kind shown in FIG. 3 can be used. In this figure, the beam 26, on emerging from the focusing lens 32 impinges on a mirror 58 mounted axially on a revolving ring 60. The beam reflected from the mirror 58 is again reflected by a mirror 62 mounted at the edge of the ring 60. The ring 60 is driven by a pinion 64 so that the mirror 62 rotates bodily around the axis of the nozzle. The arrangement is such that the focused laser beam at the surface of the workpiece 42 describes a succession of small circles on the latter, these circles being symmetrical about the line of the cut resulting from the relative movement of the workpiece and nozzle. With a suitable relationship between the circular movement and the linear movement, the overlap of successive circles can be such that all elements in the track of the circle are scanned by the laser beam. However, we have found that when a laser beam scans in a circle in the way described, the reaction tends to spread into the small area of metal surrounded by the circle. Consequently, it is possible to cut through for the whole width of the circle without a complete overlap, the laser beam diameter and the oxygen supply being so chosen that the spread of the reaction is just enough to remove the "centres" of the circles formed by the movement of the laser beam. The gas jet flows through the nozzle towards the workpiece, as shown in FIG. 3. If the line of cut turns, the circular movement still imparts to the laser beam the same motion transverse to the direction of the cut.

To avoid inserting a driving shaft through the wall of the laser tube, the ring 60 can be driven by an induction motor if desired. Other possibilities are to use a rotating prism to provide the circular movement of the beam or to arrange a transparent plate in the path of the laser beam at an angle to the beam, so that the emergent beam is parallel to but offset with respect to the incident beam. The plate or block is now rotated about the axis of the incident beam to cause the emergent beam to sweep out a circle. An elliptical beam movement could be produced by two elements arranged in series in the path of the beam and at 90° to one another, the angle of each to its incident beam being altered in an oscillatory manner by an electromechanical, electrostatic or magnetostrictive device.

In FIG. 3, the oxygen entering the nozzle through the inlet 38 passes into a diffusing ring 66 and enters the chamber through a series of holes 68 in the inner wall of the diffusing ring.

A rack 70 and pinion 72 are provided to permit adjustment of the cutting head.

Figure 4:
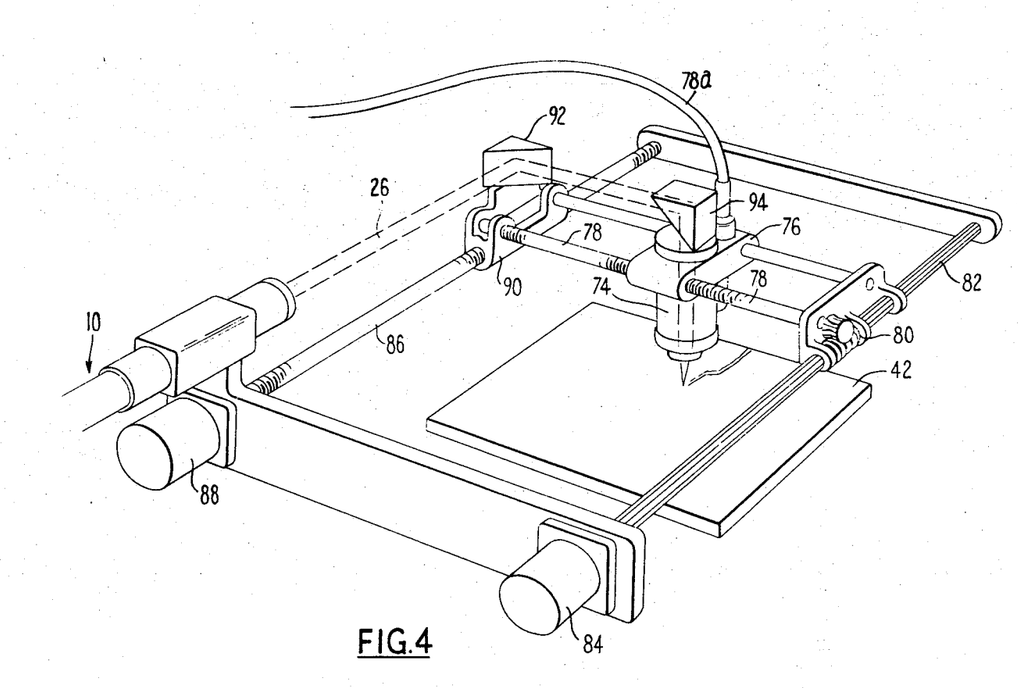
FIG. 4 shows the laser cutting head mounted on a transverse platform.

FIG. 4 shows the cutting head 74 mounted on an x-y traverse platform to permit the head to be positioned at any point over the surface of a workpiece 42 without movement of the laser 10. The cutting head 74 is mounted on a block 76 which also carries the oxygen supply tube 78a. The block 76 is mounted on a lead screw 78, the rotation of which provides the y traversing movement, the lead screw 78 being rotated by a sliding worm 80 on a splined shaft 82 driven by a motor 84. The x traversing movement is obtained by the rotation of a lead screw 86 by a motor 88, the shaft 78 being supported on a block 90 engaged on the lead screw 86. The parallel beam 26 is reflected by the prisms 92 and 94 before reaching the nozzle 74.

In the apparatus shown in FIG. 5, the height of the nozzle above the workpiece is adjustable by means of a telescopic connection 139. The laser beam 26 is reflected by a 45° reflector 140 into the telescopic arm, which terminates in a nozzle of the kind having a diffusing ring 66 of the kind shown in FIG. 3.

The nozzle and aligned guide tube shown in FIG. 5 can be used in the apparatus of FIG. 4.

The guide tube of FIG. 5 also readily permits the containment of a gas for protecting the optical reflecting surfaces. With a carbon dioxide laser, for example, generating radiation at a wavelength of 10 microns, the windows and lenses have to be of special material. Germanium can be used but is expensive and the cheaper potassium bromide suffers from the disadvantage that it is hydroscopic and therefore liable to deteriorate unless precautions are taken. A dry warm gas, such as nitrogen, in the guide tube system prevents deterioration of the potassium bromide surfaces.

Among refractory metals cut by the combination of a laser and an exothermically reacting gas are tantalum, a tantalum alloy containing 10 percent tungsten and a niobium alloy containing 10 percent tungsten. We have also cut Nilo K, an iron-nickel alloy ("Nilo" is a Registered Trade Mark).

We claim:

1. Apparatus for subjecting a workpiece to the action of a coherent light beam, comprising: a laser generating a coherent light beam; optical means for directing the laser beam through the apparatus towards a workpiece; a nozzle through which the laser beam emerges from the apparatus in the direction of the workpiece; and means for directing at the workpiece through the said nozzle, a gas which is exothermically reactive with the workpiece and under sufficient pressure to sweep away the resulting reaction products.

2. Apparatus for subjecting a workpiece to the action of a coherent light beam, comprising: a laser generating a coherent light beam; tubular means surrounding the laser beam; optical means supported by the tubular means for focussing the laser beam on to a workpiece; a nozzle at the end of the said tubular means, the laser beam emerging through the said nozzle in the direction of the workpiece; and means for directing at the workpiece through the said nozzle, a gas stream which is exothermically reactive with the workpiece and under sufficient pressure to sweep away resulting reaction products.

3. Apparatus in accordance with claim 2, further comprising: driving means for effecting relative movement between the said nozzle and a workpiece in the required direction of a path of action of the coherent light beam along the workpiece; a light-directing device supported by the tubular means and arranged in the path of the laser beam; and means for moving the light-directing device in such a manner that at the surface of the workpiece, the laser beam executes a cyclically repetitive movement transverse to the direction of the said relative movement.

4. Apparatus in accordance with claim 3, in which the said light directing device is given a movement of rotation to cause the laser beam at the surface of the workpiece to execute a circular movement symmetrical about the center line of the said relative movement.

5. Apparatus in accordance with claim 2, further including guiding means for the laser beam, the guiding means, comprising: a first lead screw supporting the said nozzle for movement in response to rotation of the lead screw; first internally threaded means mounted on the said lead screw, the said nozzle being supported on the internally threaded means; a reflector supported by the said internally threaded means; a second lead screw; a second internally threaded means mounted on the second lead screw and carrying the first lead screw; a further reflector supported by the second internally threaded means; the laser and the reflectors being so arranged that the beam is directed through the exit of the nozzle, the position of which is governed by the rotation of the said lead screws.

6. Apparatus for subjecting a workpiece to the action of coherent light, comprising:
laser means for generating first and second coherent light beams;
first and second optical means for directing the first and second beams, respectively, through the apparatus towards a workpiece;
mounting means for the said laser means and optical means whereby said first and second beams are directed on to the said workpiece at an angle to one another so that they converge to a point in the neighbourhood of the surface of the workpiece to make parallel cuts which converge to a point below the surface of the workpiece;
and first and second jet forming nozzles mounted on said mounting means so that the first and second laser beams emerge respectively through the said nozzles in the direction of the workpiece;
and means for supplying gas to said nozzles at a pressure such that on emerging from the nozzles the gas sweeps away molten or vaporized material.

7. Apparatus for subjecting a workpiece to the action of a coherent light beam, comprising:
a laser generating a coherent light beam;
optical means for connecting the laser beam onto a workpiece;
a jetforming nozzle having an outlet through which the laser beam emerges from the apparatus in the direction of the workpiece;
a housing surrounding at least a portion of the laser beam and extending back from said nozzle towards said laser, said housing having a gas inlet spaced from said nozzle outlet and communicating through said housing with the interior of said nozzle; and means for supplying gas to said inlet at a pressure such that on emerging from the nozzle the gas sweeps away molten or vaporized material.

8. Apparatus in accordance with claim 7, further comprising:
driving means for effecting relative movement between the said nozzle and a workpiece in the required direction of a path of action of the coherent light beam along the workpiece;
a light-directing device supported by the said housing and arranged in the path of the laser beam;
and means for moving the light-directing device in such a manner that at the surface of the workpiece the laser beam executes a cyclically repetitive movement transverse to the direction of the said relative movement.

9. Apparatus in accordance with claim 8, in which said light-directing device is given a movement of rotation to cause the laser beam at the surface of the workpiece to execute a circular movement symmetrical about the centre line of the said relative movement.

10. Apparatus in accordance with claim 7, further including guiding means for the laser beam, the guding means comprising:
a first lead screw supporting the said nozzle for movement in response to rotation of the lead screw;
first internally threaded means mounted on the said lead screw, the said nozzle being supported on the internally threaded means;
a reflector supported by the said internally threaded means;
a second lead screw;
a second internally threaded means mounted on the second lead screw and carrying the first lead screw;
a further reflector supported by the second internally threaded means, the laser and the reflectors being so arranged that the beam is directed through the exit of the nozzle, the position of which is governed by the rotation of the said lead screws.

11. Apparatus as defined by claim 7 including a transparent shield supported by said housing on that side of said gas inlet remote from said nozzle outlet to prevent flow of gas from said inlet toward said laser.

12. Apparatus as defined in claim 7 in which said nozzle includes a detachable tip portion.

13. Apparatus for subjecting a workpiece to the action of a coherent light beam, comprising:
a laser generating a coherent light beam;
a head assembly remote from said laser and terminating in a nozzle having an outlet through which the laser beam emerges from the apparatus in the direction of the workpiece;
a lens mounted in said head assembly for focusing said coherent light beam on to the workpiece;
a gas inlet in said head assembly communicating with said nozzle outlet, said nozzle outlet forming the gas introduced by said gas inlet into a gas jet discharging from said nozzle outlet on to said workpiece and coaxial with said laser beam:
and means for adjusting the position of the head assembly normal to the workpiece independently of the laser, whereby the laser beam can be focused on to the workpiece without moving the laser.

14. Apparatus for subjecting a workpiece to the action of a coherent light beam, comprising:
a laser generating a coherent light beam;

an enclosure surrounding at least a portion of the length of the laser beam;

optical means supported by the enclosure for focusing the laser beam on to a workpiece;

said enclosure terminating in a nozzle in the path of said laser beam and having an outlet through which the laser beam emerges from the apparatus in the direction of the workpiece and a gas inlet spaced from and communicating with said nozzle outlet, said nozzle outlet forming the gas intorduced by said gas inlet into a gas jet discharging from said nozzle outlet on to said workpiece;

driving means for achieving relative movement between said nozzle on the one hand and said workpiece and said laser on the other hand;

and guiding means controlling the direction of such relative movement and permitting said nozzle to follow a nonlinear path relative to said workpiece.

* * * * *

UNITED STATES PATENT OFFICE
CERTIFICATE OF CORRECTION

Patent No. 3,749,878          Dated July 31, 1973

Inventor(s) ARTHUR B. J. SULLIVAN and PETER THOMAS HOULDCROFT

It is certified that error appears in the above-identified patent and that said Letters Patent are hereby corrected as shown below:

IN THE CLAIMS:

Column 7, line 57, change "connecting" to ---concentrating---.

Signed and sealed this 11th day of March 1975.

(SEAL)
Attest:

RUTH C. MASON
Attesting Officer

C. MARSHALL DANN
Commissioner of Patents
and Trademarks